T. J. CAGLE.
COLLAPSIBLE POULTRY COOP.
APPLICATION FILED JULY 10, 1917.
1,260,141.
Patented Mar. 19, 1918.
3 SHEETS—SHEET 1.
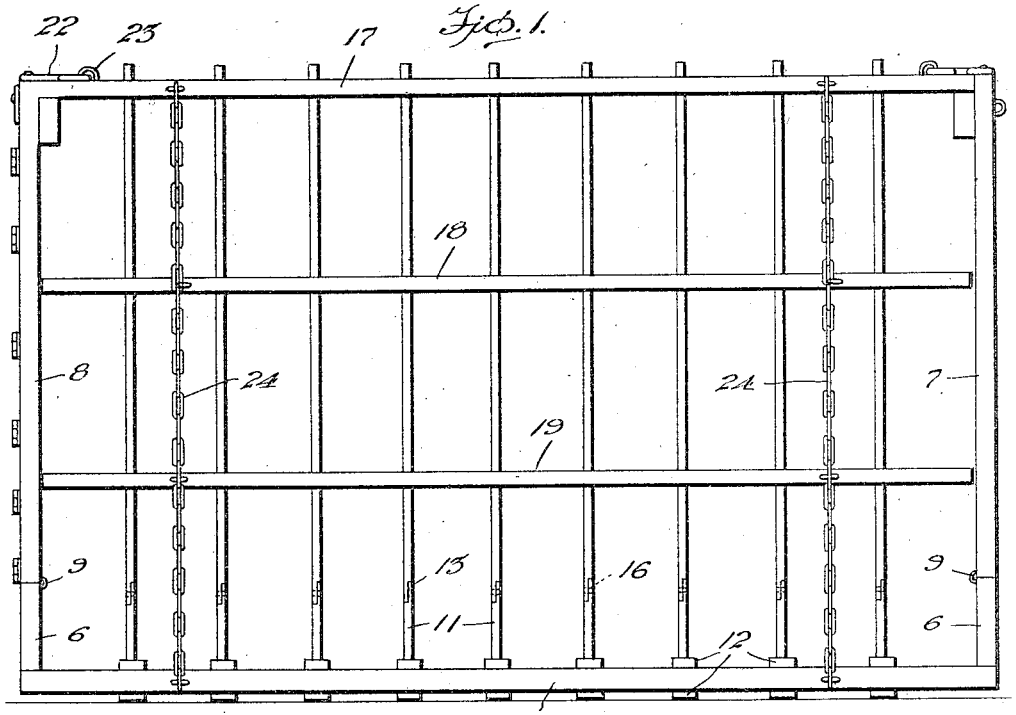
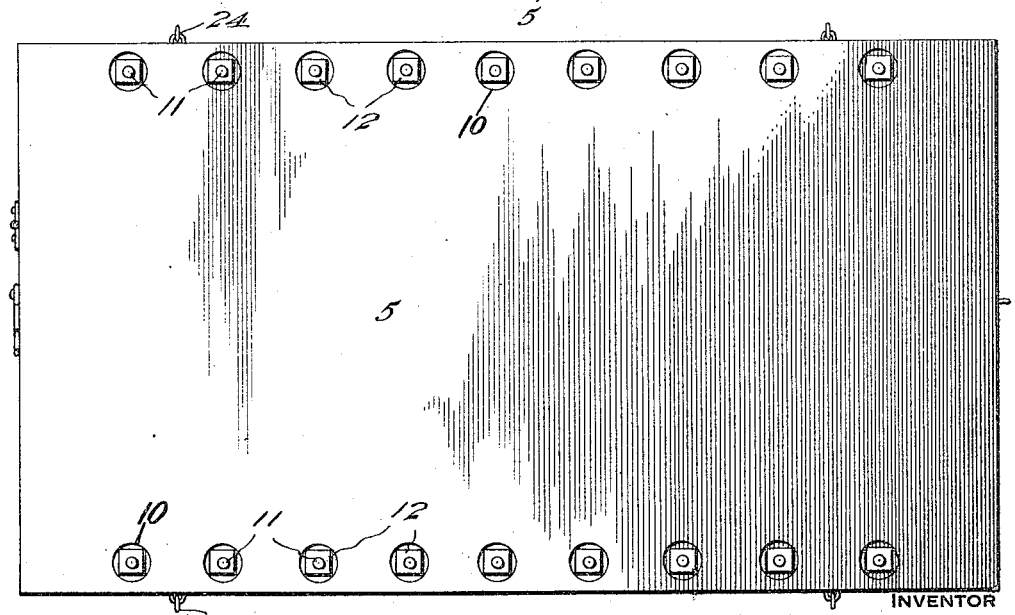

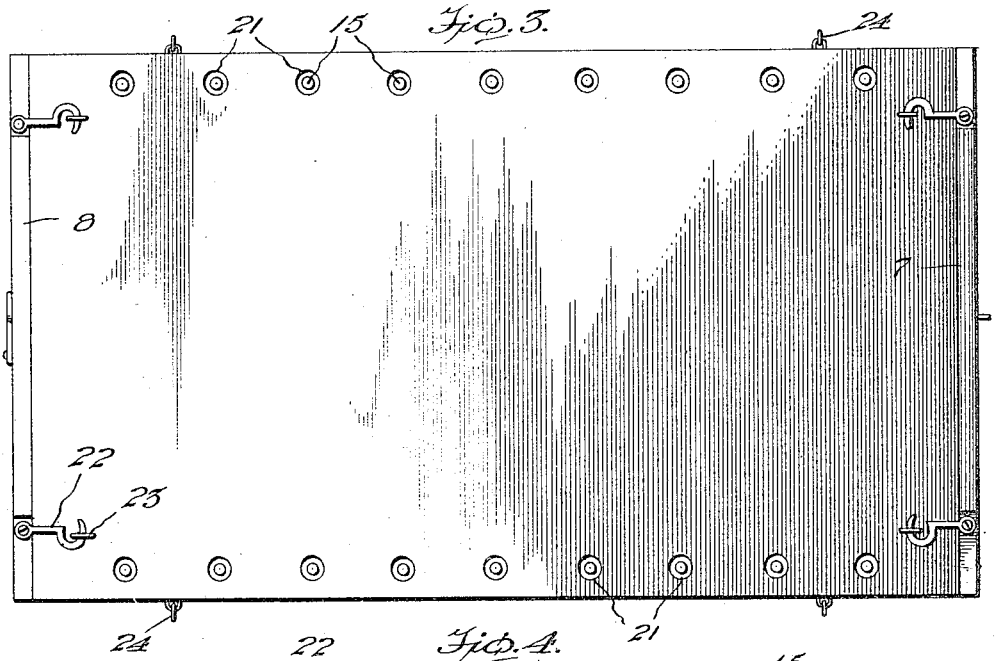
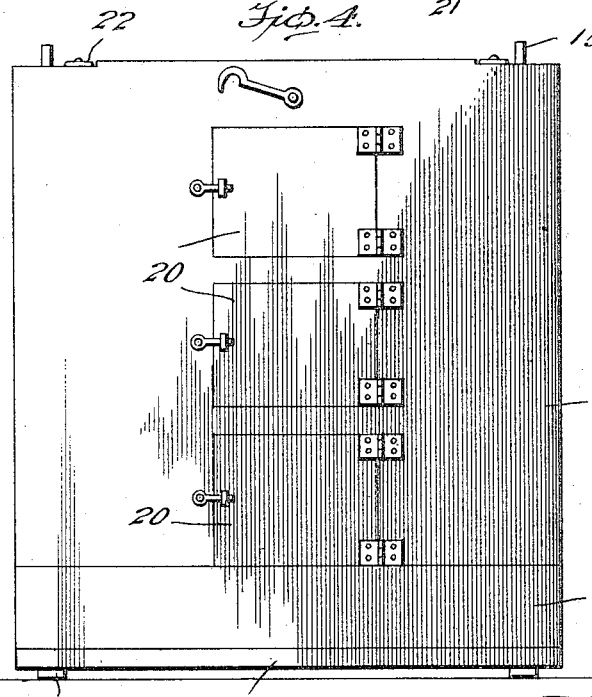

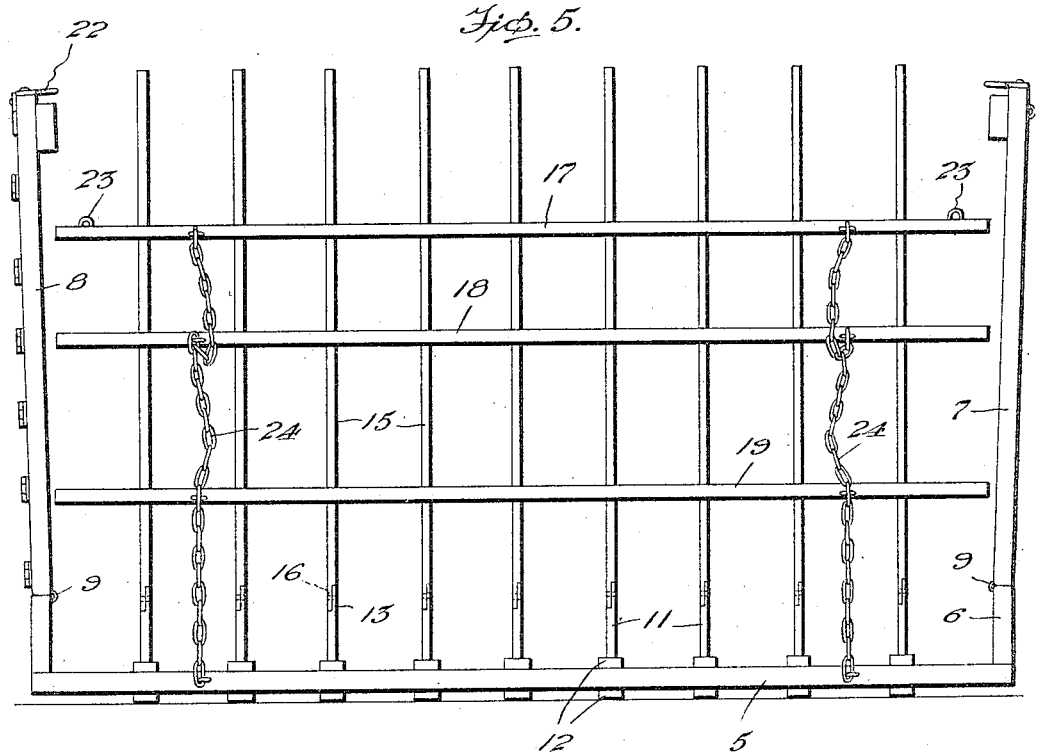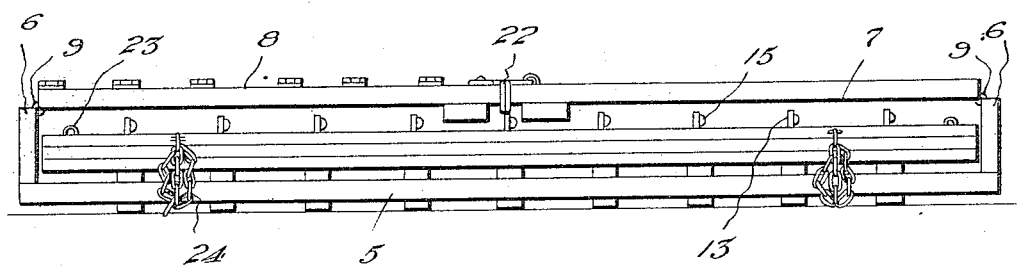

UNITED STATES PATENT OFFICE.

TRAVIS JAS. CAGLE, OF GAFFNEY, SOUTH CAROLINA.

COLLAPSIBLE POULTRY-COOP.

1,260,141.   Specification of Letters Patent.   Patented Mar. 19, 1918.

Application filed July 10, 1917. Serial No. 179,781.

*To all whom it may concern:*

Be it known that I, TRAVIS J. CAGLE, a citizen of the United States, residing at Gaffney, in the county of Cherokee and State of South Carolina, have invented new and useful Improvements in Collapsible Poultry-Coops, of which the following is a specification.

The present invention comprehends the production of a crate, and is primarily directed to a foldable crate especially adapted for the storage or transportation of poultry.

An object of the invention resides in the production of a crate of the above stated character that will be light and easily handled, strong, durable and efficient in use, and designed to permit of the crate to be set up and knocked down in a convenient and expeditious manner, the crate when in folded or compact condition occupying but a minimum amount of space for the storage or transportation of the same.

A further object of the invention is directed to a novel construction of side walls foldably connected with the crate to enable the main bottom or supplemental bottom of the crate to be slidably mounted thereon, providing within the crate, upon the unfolding of the same, a series of storage compartments.

Furthermore, I contemplate the provision of a flexible connecting member serving to connect the main and supplemental bottoms of the crate with the top wall, consequently, upon the unfolding of the crate, will prevent the said bottoms from becoming accidentally displaced from the side walls.

With the above and other objects in view, the invention consists in the novel features, details of construction and combination of parts which will hereinafter be more fully set forth, illustrated in the accompanying drawings and pointed out in the appended claims.

Figure 1 is a side elevation;

Fig. 2 is a bottom plan view;

Fig. 3 is a top plan view;

Fig. 4 is an end view;

Fig. 5 is a side view of the crate in a partially folded condition; and

Fig. 6 is a view similar to Fig. 5, showing the crate in a complete folded condition.

Referring more particularly to the accompanying drawings, in which like characters of reference refer to corresponding parts in the several views, the crate in its entirety is of substantially rectangular form, and comprises a bottom wall 5 having secured along the opposite transverse edges thereof upstanding end strips 6. The solid end walls 7 and 8 respectively are connected with the end strips 6 for inward swinging movement, through the medium of hinges 9, adapting the end walls of the crate, upon the latter resuming a folded position, to repose upon the crate structure. The bottom wall 5 of the crate is provided throughout its length and at points adjacent the opposite longitudinal edges thereof, with spaced rows of openings 10, and projecting through said openings are metallic studs 11, and these studs are permanently connected to the bottom wall of the crate in a perpendicular relation therewith, through the medium of nuts 12. The free extremity of each stud is formed with a tenon or tongue 13 to which the reduced lower extremity of each rod 15 is pivotally connected by the pin 16. The rods 15, preferably made of metal, are utilized when in vertical position, as the side walls of the crate, and the manner of connection of the rods with the tongues of the studs permits of the rods to be folded in an inward horizontal direction, that is, when the crate is in a collapsed condition.

The chief characteristic of the present invention embodies the provision of a plurality of sections slidably mounted on the rods, to provide, when the crate is in an unfolded position, a top wall 17 and an upper and lower auxiliary bottom 18 and 19 respectively, preferably made of wood and providing within the crate a plurality of storage compartments wherein access may be obtained individually thereto by the provision in the solid end wall 8 of the crate, a plurality of doors or closures 20. Each of the top and auxiliary bottom sections is provided along the longitudinal edges thereof with spaced rows of openings 21 alining vertically with the studs 11, to permit, upon the unfolded position of the crate of the bottom and top sections sliding on the rods 15, whereas when the crate is in a folded or compact condition, will permit of these top and auxiliary sections sliding downwardly upon the bottom wall 5 of the crate with the studs 11 projecting through the openings of the top and auxiliary bottom sections. After this operation, the rods 15 are swung in an inward horizontal direction and reposing upon the outer face of the top section of the crate 17. In order to complete the folding operation of the crate, the respective end walls 7 and 8 thereof are swung inwardly and upon the rods 15. It is obvious the provision of the end strips 6 of the crate, owing to the height of the studs approximately equaling the height of said end strips, affords when the side walls and the top and auxiliary bottom sections of the crate are in a collapsed condition, an inward swinging movement of the end walls 7 and 8 of the crate. When desiring to unfold the crate, the opposite end walls 7 and 8 are swung in an outward direction, and by the collapsing of the crate, the top and auxiliary bottom sections will slide downwardly on the rods and the crate is retained in a set position by the engagement of the hooks 22 carried along the upper edges of the end walls, with the keepers 23 adjacent the ends of the top section 17. For preventing any accidental displacement of either the top wall or section and the auxiliary bottom walls of the sections from the rods during the opening action of the crate, and further to enable the auxiliary bottom sections to support thereon, use is made of a pair of flexible chains 24 connected to the opposite longitudinal edges of each of the bottom wall, top wall and auxiliary bottoms of the crate. It is, therefore, obvious that these flexible connections perform a twofold function and are further useful in serving as a partial obstruction to the escape of the poultry from the crate.

From the foregoing description, taken in connection with the accompanying drawings, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:—

1. A foldable poultry coop comprising a bottom and solid end walls hingedly connected to the bottom for longitudinal swinging movement, a plurality of rods pivotally connected along the opposite longitudinal edges of the bottom wall and serving to form the side walls of the crate, a top wall slidably mounted on said rods, and means carried by the end walls and coöperating with the top wall for holding the same against movement.

2. A foldable poultry coop embodying a bottom wall, end walls hingedly connected thereto, side walls pivotally connected with the bottom wall, auxiliary bottom sections slidably mounted on the side walls, a top wall slidably mounted on the side walls, and means connecting the top wall and auxiliary bottom sections with the bottom wall of the crate for providing between the bottom, auxiliary bottoms and top wall a plurality of compartments.

3. A foldable poultry coop embodying a bottom wall, end walls hingedly connected thereto, side walls pivotally connected with the bottom wall, auxiliary bottom sections slidably mounted on the side walls, a top wall slidably mounted on the side walls, and means connecting the top wall and auxiliary bottom sections with the bottom wall of the crate for providing between the bottom, auxiliary bottoms and top wall a plurality of compartments, said means preventing any accidental collapsing of the auxiliary bottom sections when subjected to the weight of the contents of the crate.

4. A foldable poultry coop embodying a bottom wall, end walls hingedly connected thereto, side walls pivotally connected with the bottom wall, auxiliary bottom sections slidably mounted on the side walls, a top wall slidably mounted on the side walls, and flexible connecting means connecting the top wall and auxiliary bottom sections with the bottom wall of the crate for providing between the bottom, auxiliary bottoms and top wall a plurality of compartments, said means preventing any accidental collapsing of the auxiliary bottom sections when subjected to the weight of the contents of the crate.

In testimony whereof I affix my signature.

TRAVIS JAS. CAGLE.

Copies of this patent may be obtained for five cents each, by addressing the "Commissioner of Patents, Washington, D. C."